United States Patent
Sun et al.

(10) Patent No.: US 9,294,937 B2
(45) Date of Patent: Mar. 22, 2016

(54) APPARATUS AND METHOD FOR SELECTION BETWEEN RECEIVERS IN A WIRELESS COMMUNICATION SYSTEM

(71) Applicant: Qualcomm Incorporated, San Diego, CA (US)

(72) Inventors: Jing Sun, San Diego, CA (US); Peter P. Ang, San Diego, CA (US); Ameer Dabbagh, San Diego, CA (US); Rashid Ahmed Akbar Attar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 272 days.

(21) Appl. No.: 13/645,163

(22) Filed: Oct. 4, 2012

(65) Prior Publication Data
US 2013/0281028 A1  Oct. 24, 2013

Related U.S. Application Data

(60) Provisional application No. 61/543,801, filed on Oct. 5, 2011.

(51) Int. Cl.
*H04W 24/02* (2009.01)
*H04B 1/7103* (2011.01)
*H04B 1/7115* (2011.01)

(52) U.S. Cl.
CPC ............ *H04W 24/02* (2013.01); *H04B 1/7103* (2013.01); *H04B 1/7115* (2013.01)

(58) Field of Classification Search
CPC ....... H04W 4/00; H04W 24/00; H04W 24/02; H04W 24/04; H04W 24/08; H04W 1/7103; H04W 1/7115; H04B 1/71

USPC ............. 455/63.1, 67.11, 67.13, 68, 69, 133, 455/134, 226.1, 245.2, 254, 296, 422.1, 455/423–425; 375/147, 152, 346, 349
See application file for complete search history.

(56) References Cited

U.S. PATENT DOCUMENTS 6,904,081 B2    6/2005  Frank
7,356,071 B2 *  4/2008  Li et al. .................. 375/147
(Continued)

FOREIGN PATENT DOCUMENTS

CN    1368798 A    9/2002
JP    2002111538 A    4/2002
(Continued)

OTHER PUBLICATIONS

International Search Report and Written Opinion—PCT/US2012/061692—ISA/EPO—Feb. 20, 2012.
(Continued)

*Primary Examiner* — Thanh Le
(74) *Attorney, Agent, or Firm* — Darren M. Simon

(57) ABSTRACT

Apparatus and methods are disclosed for selecting between a Rake receiver and an interference cancellation engine (ICE) for receiving forward link signals in a wireless communication network. Selection can be based on one or more of various factors in the channel. These factors can include an average SINR of at least one of the first receiver or the second receiver, a dispersion of a downlink channel, a flatness metric, a number of locked fingers at the first receiver or the second receiver, or a size of an Active Set. Other aspects, features, and embodiments are claimed and described.

44 Claims, 5 Drawing Sheets

(56) References Cited

U.S. PATENT DOCUMENTS

| | | |
|---|---|---|
| 7,586,863 B2 | 9/2009 | Tu et al. |
| 7,881,412 B2 | 2/2011 | Banister |
| 7,894,514 B2 | 2/2011 | Dominique et al. |
| 7,925,302 B2 | 4/2011 | Ulupinar et al. |
| 8,055,293 B1 * | 11/2011 | Vargantwar ......... H04W 52/362 455/423 |
| 8,494,469 B2 * | 7/2013 | Haub et al. ................ 455/245.2 |
| 8,554,151 B2 * | 10/2013 | Cho et al. .................. 455/67.13 |
| 8,600,423 B2 * | 12/2013 | Erceg et al. ................ 455/63.1 |
| 2002/0196871 A1 | 12/2002 | Nishio et al. |
| 2008/0013654 A1 | 1/2008 | Rick et al. |
| 2008/0075147 A1 | 3/2008 | Grossman et al. |
| 2008/0259893 A1 | 10/2008 | Murata et al. |
| 2009/0168914 A1 | 7/2009 | Chance et al. |
| 2009/0275335 A1 * | 11/2009 | Jalloul .................. H04W 24/08 455/67.11 |
| 2010/0279702 A1 | 11/2010 | Kazmi et al. |
| 2010/0296553 A1 | 11/2010 | Luschi et al. |
| 2011/0051797 A1 | 3/2011 | Won et al. |
| 2011/0201295 A1 | 8/2011 | Ma et al. |

FOREIGN PATENT DOCUMENTS

| | | |
|---|---|---|
| JP | 2004159284 A | 6/2004 |
| JP | 2006094215 A | 4/2006 |
| JP | 2007189271 A | 7/2007 |
| KR | 20080063290 A | 7/2008 |
| KR | 20100085762 A | 7/2010 |
| KR | 20100128746 A | 12/2010 |
| WO | 0159945 A1 | 8/2001 |
| WO | 02078205 A1 | 10/2002 |
| WO | 03036810 A1 | 5/2003 |
| WO | 2007031691 A1 | 3/2007 |
| WO | WO-2007102897 A2 | 9/2007 |
| WO | WO-2007105488 A1 | 9/2007 |
| WO | 2008071600 A1 | 6/2008 |

OTHER PUBLICATIONS

International Search Report and Written Opinion—PCT/US2012/059070—ISA/EPO—Jan. 24, 2013.

Buchacher C., et al., "A hybrid equalizer/Rake receiver for the Wideband CDMA Downlink in large delay spread channels", Copernicus Publications on behalf of the URSI Landesausschuss in der Bundesrepublik Deutschland e.V. 2008, XP002617795, Retrieved from the Internet: URL:http://www.adv-radio-sci.net/6/107/200 8/ars-6-107-2008.pdf.

* cited by examiner

APPARATUS AND METHOD FOR SELECTION BETWEEN RECEIVERS IN A WIRELESS COMMUNICATION SYSTEM

CROSS-REFERENCE TO RELATED APPLICATION & PRIORITY CLAIM

This application claims priority to and the benefit of provisional patent application No. 61/543,801, filed in the United States Patent and Trademark Office on Oct. 5, 2011, the entire content of which is incorporated herein by reference as if fully set forth below in its entirety and for all applicable purposes.

TECHNICAL FIELD

Embodiments of the present invention relate generally to wireless communication, and more specifically, to receiver technology for use with wireless communication devices.

BACKGROUND

Wireless communications systems are widely deployed to provide various types of communication content such as voice, video, packet data, messaging, broadcast, and so on. These systems may be accessed by various types of access terminals adapted to facilitate wireless communications, where multiple access terminals share the available system resources (e.g., time, frequency, and power).

In these systems, the RF performance at the access terminal is a key feature for which further optimization is continuously sought. Thus, many variations of receivers have been developed, and can provide excellent RF performance for wireless access terminals.

One of many issues with which designers of RF receivers are faced is interference. For example, in any multiple access system such as a cellular communication network, interference caused by wireless communication with other users in the network can inhibit the receiver's performance. Further, by virtue of multipath fading, interference from the desired signal itself, which can be smeared over time by the channel before arriving at the receiver, can additionally inhibit the receiver's performance. Because different types of receiver can better address different types of interference, some access terminals have been known to include more than one type of receiver, or in other examples, two or more functional blocks may be included within a receiver, such as its front-end or back-end. In this way, selection of a more suitable receiver, or a more suitable functional block, may be made in an effort to improve the overall performance of the receiver as well as enabling efficient power use.

As the demand for mobile broadband access continues to increase, research and development continue to advance the technology not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Apparatus and methods are disclosed for selecting between a Rake receiver and an interference cancellation engine (ICE) for receiving forward link signals in a wireless communication network. The selection is based on one or more of various factors in the channel, such as an average SINR of at least one of the first receiver or the second receiver, a dispersion of a downlink channel, a flatness metric, a number of locked fingers at the first receiver or the second receiver, or a size of an Active Set.

In one aspect, the disclosure provides a method of selecting between a first receiver and a second receiver in a wireless communications device. Here, the method includes determining one or more of: an average SINR corresponding to at least one of the first receiver or the second receiver, a dispersion of a downlink channel, a flatness metric, a number of locked fingers at the first receiver or the second receiver, or a size of an Active Set, and selecting one of the first receiver or the second receiver in accordance with the determination.

Another aspect of the disclosure provides a wireless communication device for use in receiving data, the device including a first receiver, a second receiver, and a processor operatively coupled to the first and the second receiver. Here, the processor is configured to select one of the first or the second receiver in accordance with one or more of: an average SINR of at least one of the first receiver or the second receiver, a dispersion of a downlink channel, a flatness metric, a number of locked fingers at the first receiver or the second receiver, or a size of an Active Set.

Another aspect of the disclosure provides a wireless communication device for use in receiving data, including first receiving means and second receiving means for receiving a downlink channel, means for determining one or more of: an average SINR corresponding to at least one of the first receiving means or the second receiving means, a dispersion of the downlink channel, a flatness metric, a number of locked fingers at the first receiving means or the second receiving means, or a size of an Active Set, and means for selecting one of the first receiving means or the second receiving means in accordance with the determination.

Another aspect of the disclosure provides computer program product, including a computer-readable storage medium operable at a wireless communications device, having instructions for causing a computer to determine one or more of: an average SINR corresponding to at least one of a first receiver or a second receiver, a dispersion of a downlink channel, a flatness metric, a number of locked fingers at the first receiver or the second receiver, or a size of an Active Set and to select one of the first receiver or the second receiver in accordance with the determination.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

The various concepts presented throughout this disclosure may be implemented across a broad variety of wireless communication systems, network architectures, and communication standards. Certain aspects of the discussions are described below for CDMA and 3rd Generation Partnership Project 2 (3GPP2) 1× protocols and systems, and related terminology may be found in much of the following description. However, those of ordinary skill in the art will recognize that one or more aspects of the present disclosure may be employed and included in one or more other wireless communication protocols and systems.

Figure 1:
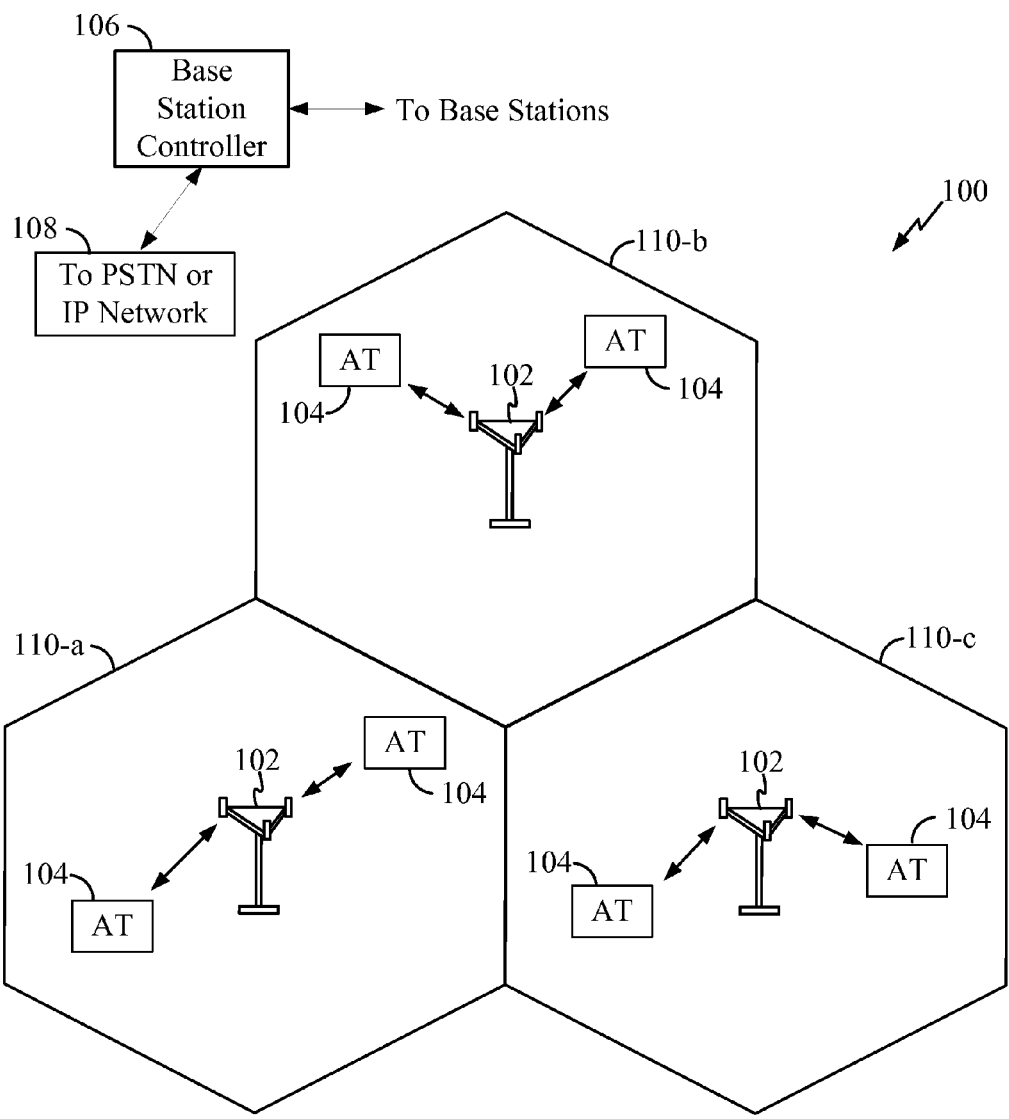
FIG. 1 is a block diagram illustrating an example of a network environment in which one or more aspects of the present disclosure may find application.

FIG. 1 is a block diagram illustrating an example of a network environment in which one or more aspects of the present disclosure may find application. The wireless communication system 100 generally includes one or more base stations 102, one or more access terminals 104, one or more base station controllers (BSC) 106, and a core network 108 providing access to a public switched telephone network (PSTN) (e.g., via a mobile switching center/visitor location register (MSC/VLR)) and/or to an IP network (e.g., via a packet data switching node (PDSN)). The system 100 may support operation on multiple carriers (waveform signals of different frequencies). Multi-carrier transmitters can transmit modulated signals simultaneously on the multiple carriers. Each modulated signal may be a CDMA signal, a TDMA signal, an OFDMA signal, a Single Carrier Frequency Division Multiple Access (SC-FDMA) signal, etc. Each modulated signal may be sent on a different carrier and may carry control information (e.g., pilot signals), overhead information, data, etc.

The base stations 102 can wirelessly communicate with the access terminals 104 via a base station antenna. The base stations 102 may each be implemented generally as a device adapted to facilitate wireless connectivity (for one or more access terminals 104) to the wireless communications system 100. A base station 102 may also be referred to by those skilled in the art as an access point, a base transceiver station (BTS), a radio base station, a radio transceiver, a transceiver function, a basic service set (BSS), an extended service set (ESS), a Node B, a femto cell, a pico cell, and/or some other suitable terminology.

The base stations 102 are configured to communicate with the access terminals 104 under the control of the base station controller 106 via multiple carriers. Each of the base stations 102 can provide communication coverage for a respective geographic area. The coverage area 110 for each base station 102 here is identified as cells 110-a, 110-b, or 110-c. The coverage area 110 for a base station 102 may be divided into sectors (not shown, but making up only a portion of the coverage area). In a coverage area 110 that is divided into sectors, the multiple sectors within a coverage area 110 can be formed by groups of antennas with each antenna responsible for communication with one or more access terminals 104 in a portion of the cell.

One or more access terminals 104 may be dispersed throughout the coverage areas 110, and may wirelessly communicate with one or more sectors associated with each respective base station 102. An access terminal 104 may generally include one or more devices that communicate with one or more other devices through wireless signals. Such access terminals 104 may also be referred to by those skilled in the art as a user equipment (UE), a mobile station (MS), a subscriber station, a mobile unit, a subscriber unit, a wireless unit, a remote unit, a mobile device, a wireless device, a wireless communications device, a remote device, a mobile subscriber station, a mobile terminal, a wireless terminal, a remote terminal, a handset, a terminal, a user agent, a mobile client, a client, or some other suitable terminology. The access terminals 104 may include mobile terminals and/or at least substantially fixed terminals. Examples of access terminals 104 include mobile phones, pagers, wireless modems, personal digital assistants, personal information managers (PIMs), personal media players, palmtop computers, laptop computers, tablet computers, televisions, appliances, e-readers, digital video recorders (DVRs), machine-to-machine (M2M) devices, and/or other communication/computing devices which communicate, at least partially, through a wireless or cellular network.

Figure 2:
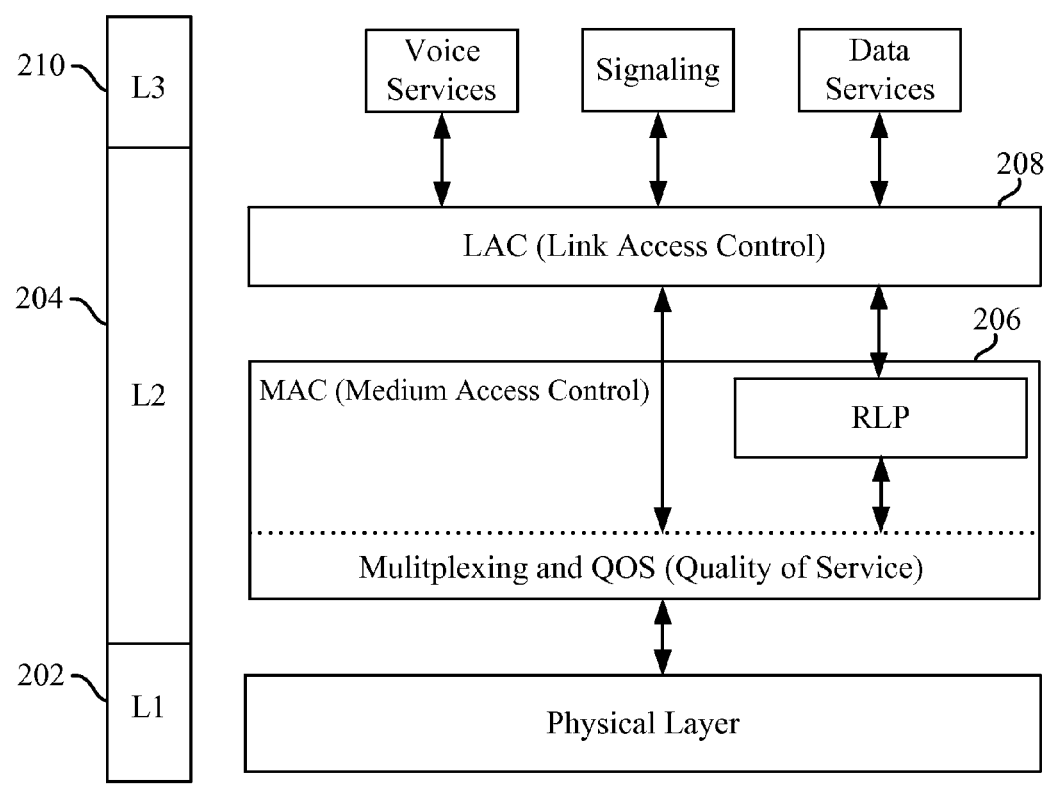
FIG. 2 is a block diagram illustrating an example of a protocol stack architecture which may be implemented by an access terminal according to some embodiments of the present invention.

The access terminal 104 may be adapted to employ a protocol stack architecture for communicating data between the access terminal 104 and one or more network nodes of the wireless communication system 100 (e.g., the base station 102). A protocol stack generally includes a conceptual model of the layered architecture for communication protocols in which layers are represented in order of their numeric designation, where transferred data is processed sequentially by each layer, in the order of their representation. Graphically, the "stack" is typically shown vertically, with the layer having the lowest numeric designation at the base. FIG. 2 is a block diagram illustrating an example of a protocol stack architecture which may be implemented by an access terminal 104. Referring to FIGS. 1 and 2, the protocol stack architecture for the access terminal 104 is shown to generally include three layers: Layer 1 (L1), Layer 2 (L2), and Layer 3 (L3).

Layer 1 202 is the lowest layer and implements various physical layer signal processing functions. Layer 1 202 is also referred to herein as the physical layer 202. This physical layer 202 provides for the transmission and reception of radio signals between the access terminal 104 and a base station 102.

The data link layer, called layer 2 (or "the L2 layer") 204 is above the physical layer 202 and is responsible for delivery of signaling messages generated by Layer 3. The L2 layer 204 makes use of the services provided by the physical layer 202. The L2 layer 204 may include two sublayers: the Medium Access Control (MAC) sublayer 206, and the Link Access Control (LAC) sublayer 208.

The MAC sublayer 206 is the lower sublayer of the L2 layer 204. The MAC sublayer 206 implements the medium access protocol and is responsible for transport of higher layers' protocol data units using the services provided by the physical layer 202. The MAC sublayer 206 may manage the access of data from the higher layers to the shared air interface.

The LAC sublayer 208 is the upper sublayer of the L2 layer 204. The LAC sublayer 208 implements a data link protocol that provides for the correct transport and delivery of signaling messages generated at the layer 3. The LAC sublayer makes use of the services provided by the lower layers (e.g., layer 1 and the MAC sublayer).

Layer 3 210, which may also be referred to as the upper layer or the L3 layer, originates and terminates signaling messages according to the semantics and timing of the communication protocol between a base station 102 and the access terminal 104. The L3 layer 210 makes use of the services provided by the L2 layer. Information (both data and voice) message are also passed through the L3 layer 210.

Figure 3:
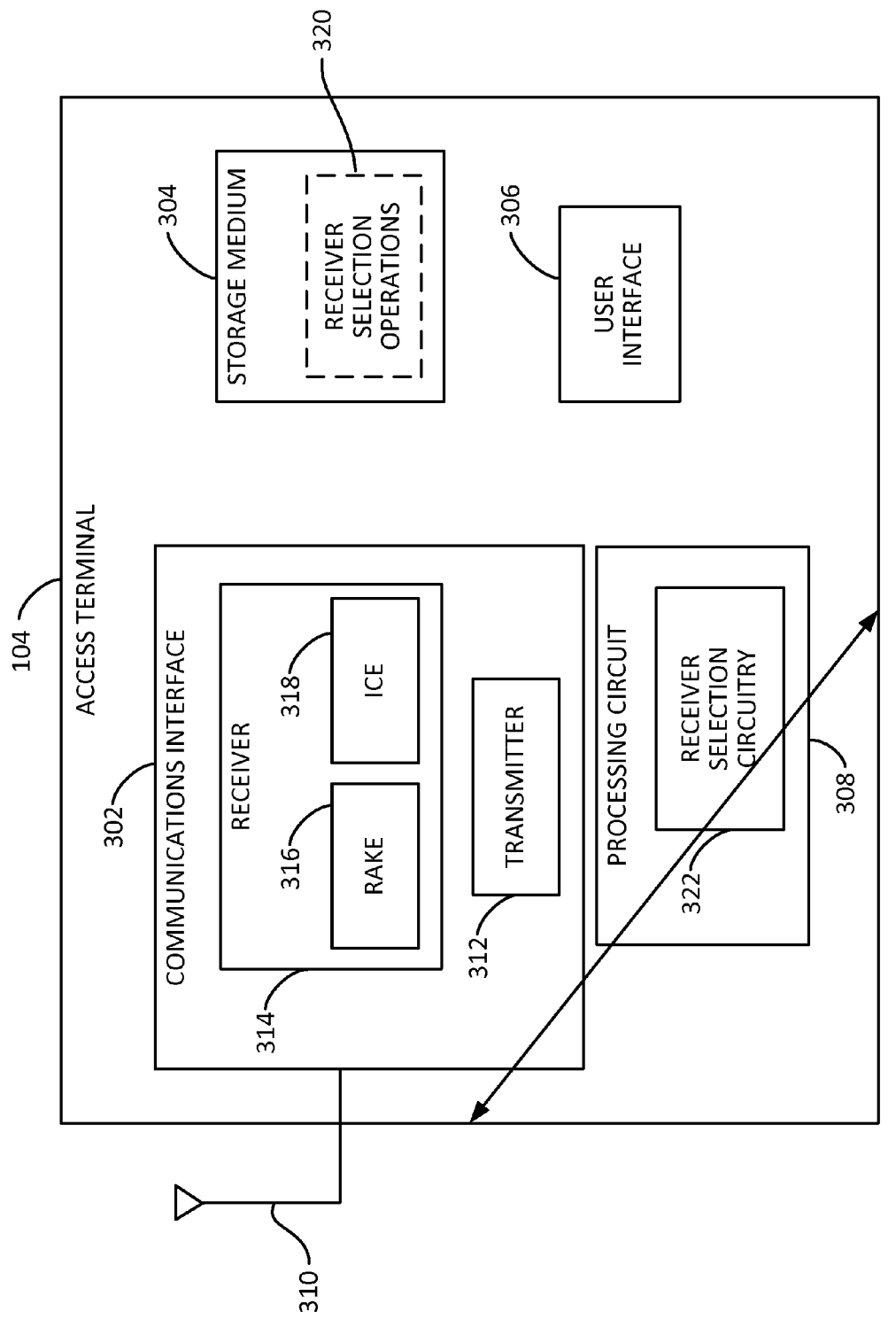
FIG. 3 is a block diagram illustrating select components of an access terminal according to some embodiments of the present invention.

FIG. 3 shows a block diagram illustrating select components of an access terminal 104 according to at least one example of the present disclosure. The access terminal 104 includes a communications interface 302, a storage medium 304, and a user interfaced 306. These components can be coupled to and/or placed in electrical communications with a processing circuit 308.

The communications interface 302 may be adapted to facilitate wireless communications of the access terminal 104. For example, the communications interface 302 may include circuitry and/or programming adapted to facilitate the communication of information bi-directionally with respect to one or more communications devices in a network. The communications interface 302 may be coupled to one or more antennas 310 for wireless communications within a wireless communications system.

The communications interface 302 can be configured with one or more standalone receivers and/or transmitters, as well as one or more transceivers. In the illustrated example, the communications interface 302 includes a transmitter 312 and a receiver 314. Further, as one nonlimiting example, the receiver 314 includes Rake receiver circuitry 316 and an interference cancellation engine (ICE) receiver 318.

That is, in any CDMA system, to enable multiple access, transmitted data is spread utilizing a suitable PN spreading code. To retrieve the data, a receiver is accordingly required to despread the received signal. To this end, CDMA receivers utilize a correlation receiver. That is, a desired signal is detected according to its correlation with an internally generated PN spreading code, which is known to be the same spreading code used at the transmitter. This way, undesired interfering signals, spread with different (ideally, orthogonal) PN spreading codes, have a low correlation and can be discarded by the correlation receiver.

However, conventional matched filter CDMA receivers are inherently interference-limited, such that there is a limited number of interfering signals for which the receiver can accommodate. To improve the situation, various multiuser detection techniques have been developed for CDMA receivers to combat such multiple access interference. For example, various linear equalizers and subtractive interference cancellation (IC) receivers have been designed for multiuser detection. Some examples of linear equalizers include the zero-forcing (ZF) or decorrelating detector, and the minimum mean square (MMSE) detector. On the other hand, IC receivers generally create an estimate of the multiple access interference and subtract that estimate from the received signal. In an aspect of the disclosure the interference cancellation engine 318 may function as such an IC receiver.

In addition to multiuser interference, which is generated by transmissions using different PN codes, wireless channels may exhibit multipath fading, where the same transmitted signal reaches the receiver after following two or more paths of different lengths. For example, a direct-path component of the signal may arrive at the receiver just before another component of the signal that reflected off a mountain or a building. In some cases, many different paths may exist, resulting in a smearing of the received signal over time, effectively causing a relatively high level of interference. Furthermore, similar issues can result when a receiver includes multiple receive antennas. To address multipath, multiple correlation receivers may be used, with each correlation receiver ("finger") being tuned to recover the energy from respective ones of the different paths/antennas. This use of multiple correlation receivers is referred to as a Rake receiver. In an aspect of the disclosure, Rake receiver circuitry 316 may function as such a Rake receiver.

In some examples, the Rake receiver 316 may generally be more preferable in a low SINR channel, or in highly dispersive channel conditions. On the other hand, the ICE receiver 318 may generally be more preferable in medium-to-high SINR channel, or when relatively large numbers of sectors are in the Active Set for the access terminal.

The storage medium 304 may represent one or more computer-readable, machine-readable, and/or processor-readable devices for storing programming, such as processor executable code or instructions (e.g., software, firmware), electronic data, databases, or other digital information. The storage medium 304 may also be used for storing data that is manipulated by the processing circuit 306 when executing programming. The storage medium 304 may be any available media that can be accessed by a general purpose or special purpose processor, including portable or fixed storage devices, optical storage devices, and various other mediums capable of storing, containing or carrying programming. By way of example and not limitation, the storage medium 304 may include a computer-readable, machine-readable, and/or processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 304 may be coupled to the processing circuit 306 such that the processing circuit 306 can read information from, and write information to, the storage medium 304. That is, the storage medium 304 can be coupled to the processing circuit 306 so that the storage medium 304 is at least accessible by the processing circuit 306, including examples where at least one storage medium is integral to the processing circuit 306 and/or examples where at least one storage medium is separate from the processing circuit 306 (e.g., resident in the access terminal 104, external to the access terminal 104, distributed across multiple entities).

Programming stored by the storage medium 304, when executed by the processing circuit 306, causes the processing circuit 306 to perform one or more of the various functions and/or process steps described herein. For example, the storage medium 304 may include receiver selection operations 320 adapted for regulating operations at one or more hardware blocks of the processing circuit 306, and/or regulating a sequence of operations when utilizing the receiver 314, as described in further detail below. The receiver selection operations 320 may include programming implemented at layer 1 of the protocol stack architecture depicted in FIG. 2, adapted for selection among the Rake receiver circuit 316 and the ICE circuit 318 in accordance with one or more suitable criteria, as described in further detail below.

The processing circuit 308 is generally adapted for processing, including the execution of such programming stored on the storage medium 304. As used herein, the term "programming" shall be construed broadly to include without limitation instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 308 is arranged to obtain, process and/or send data, control data access and storage, issue commands, and control other desired operations. The processing circuit 308 may include circuitry configured to implement desired programming provided by appropriate media in at least one example. For example, the processing circuit 308 may be implemented as one or more processors, one or more controllers, and/or other structure configured to execute executable programming. Examples of the processing circuit 308 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 308 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 306 are for illustration and other suitable configurations within the scope of the present disclosure are also contemplated.

According to one or more aspects of the present disclosure, the processing circuit 306 may be adapted to perform any or all of the features, processes, functions, steps and/or routines for any or all of the access terminals 104 described herein. As used herein, the term "adapted" in relation to the processing circuit 306 may refer to the processing circuit 306 being one or more of configured, employed, implemented, and/or programmed to perform a particular process, function, step and/ or routine according to various features described herein.

According to at least one example of the access terminal 104, the processing circuit 306 may include receiver selection circuitry 322 adapted for selection between the Rake receiver circuit 316 and the ICE circuit 318 in accordance with one or more criteria, as described in further detail below. The receiver selection circuitry 322 may operate independently of, or may utilize programming stored on, one or more components of the storage medium 304.

That is, in some mobile devices having more than one type of receiver, at any particular time (for example, during a particular time slot), it may be the case that only one type of receiver (e.g., either the Rake receiver circuit 316 or the ICE circuit 318) may be used. In other devices, even if it were possible to utilize more than one type of receiver at a given instant, it may be desired to select one or the other receiver circuit for any suitable reason. Thus, in accordance with various aspects of the disclosure, a device selection algorithm (DSA) may be utilized to select between a first receiver and a second receiver in accordance with one or more factors or parameters. By using suitable parameters to select a particular receiver, the receiving performance of the access terminal 104 can essentially equal the performance of the better of the two receivers during all scenarios.

In various aspects of the disclosure, one or more factors may be utilized by an access terminal 104 to select between first and second receivers, e.g., between the Rake receiver 316 and the ICE receiver 318. For example, the access terminal 104 may select a receiver based at least in part on the average signal-to-interference-and-noise ratio (SINR) detected by one or both of the Rake receiver circuit 316 and the ICE receiver circuit 318.

Here, the calculation of the average SINR for a receiver circuit may be based on any suitable window, e.g., being determined over one or more slots, or in another example, based on a half-slot of the current slot, and a half-slot of the prior slot.

In a further aspect of the disclosure, the dispersion of the channel may be utilized to select between receivers. Here, if the channel is more dispersive, this means that peaks of received signal energy in a multipath channel are separated by a relatively large amount. In one nonlimiting example, a channel may be characterized as a dispersive channel if greater than about 5% of the total received signal energy is found more than six chips away from the center of mass of the received signal energy. In this scenario, the Rake receiver circuit 316 may be preferable over the ICE receiver 318 since, as described above, the Rake receiver circuit 316 is configured to mitigate such multipath fading. Thus, the access terminal 104 may be configured to determine a metric that quantifies the dispersion of the channel, and if this metric is greater than some suitable threshold value, which may be determined theoretically or experimentally, the channel may be considered a dispersive channel.

In a further aspect of the disclosure, a certain flatness metric of the channel may be computed. Here, the flatness metric may be based upon a channel estimate of the serving sector, being computed based on a ratio between the minimum and the mean frequency bin channel response energy, suitably filtered through an FIR filter. If the flatness metric is high, the channel may be characterized as a flat channel; and if the metric is low, the channel may be characterized as not a flat channel. Here, not flat means generally that there is some frequency selectivity in the channel. In general, in this case with a nonflat channel, the ICE receiver 318 would be preferred.

In a further aspect of the disclosure, the number of locked fingers at the Rake receiver circuit 316 may be utilized to determine whether to select the Rake receiver circuit 316.

In yet another aspect of the disclosure, the size of the access terminal's Active Set may be utilized as a factor in selecting a receiver. That is, if the number of cells/sectors in the access terminal's Active Set is relatively high, the ICE receiver 318 may provide a benefit to the overall reception performance.

Figure 4:
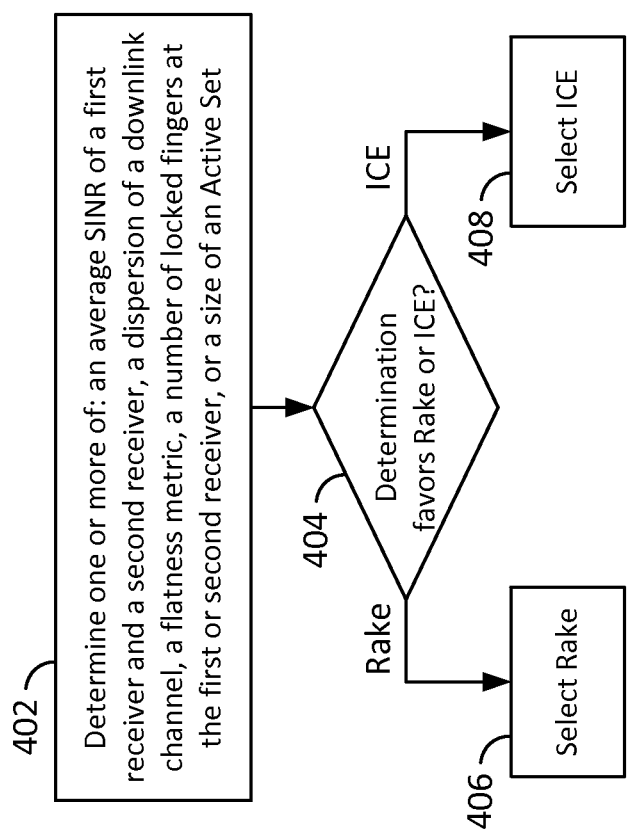
FIG. 4 is a flow chart illustrating a method of selecting a receiver in a wireless according to some embodiments of the present invention.

FIG. 4 is a flow chart illustrating a simple example of a method operational on an access terminal, such as the access terminal 104, for selecting a receiver to use in a wireless communication network. With reference to the block diagram in FIG. 3 together with the flow chart in FIG. 4, an access terminal 104 may select between a first receiver and a second receiver (e.g., the Rake receiver 316 and the ICE receiver 318) in accordance with one or more factors. That is, at step 402 the access terminal 104 may determine one or more of an average SINR of the first receiver and the second receiver, a dispersion of a downlink channel, a flatness metric, a number of locked fingers at the first or second receiver, or a size of an Active Set for the access terminal 104.

At step 404, the access terminal 104 may determine whether the factors utilized in step 402 favor usage of the Rake receiver circuit 316 or the ICE circuit 318. If the Rake receiver 316 is favored, then the process may proceed to step 406 wherein the access terminal 104 may select the Rake receiver 316; and if the ICE receiver 318 is favored, then the process may proceed to step 408 wherein the access terminal 104 may select the ICE receiver 318.

Figure 5:
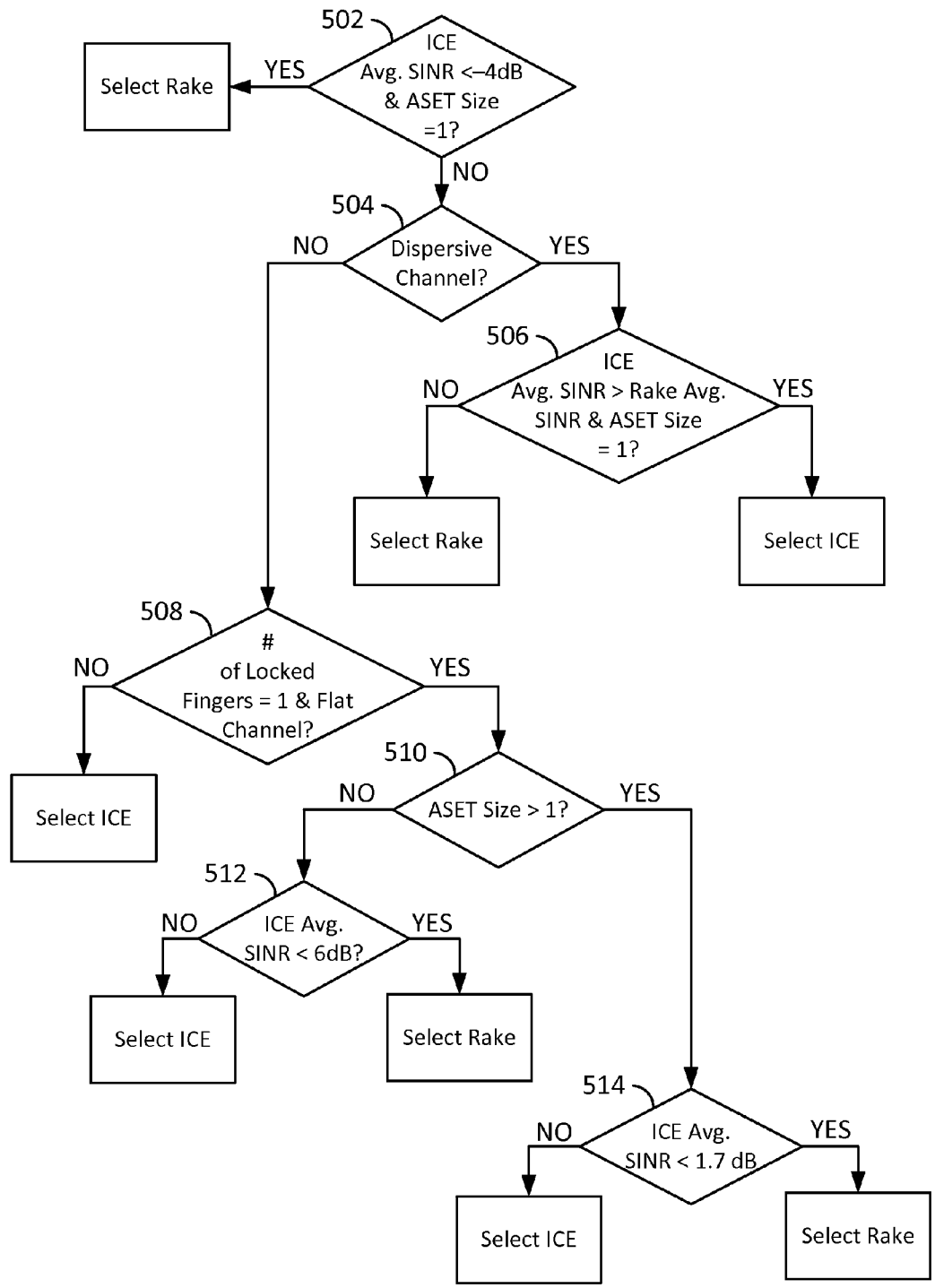
FIG. 5 is a flow chart illustrating a method of selecting a receiver in a wireless access terminal according to some embodiments of the present invention.

FIG. 5 is a flow chart illustrating another example of a method operational on an access terminal, such as the access terminal 104, for selecting a receiver to use in a wireless communication network. With reference to the block diagram in FIG. 3 together with the flow chart in FIG. 5, an access terminal 104 may select between a first receiver and a second receiver (e.g., the Rake receiver 316 and the ICE receiver 318) in accordance with one or more factors. For example, at step 502, the access terminal 104 may determine whether the average SINR of the ICE receiver 318 (e.g., being determined over any suitable window) is less than a suitable threshold value, such as—4 dB; and if the size of the Active Set for the access terminal 104 is equal to one (1). That is, the Rake receiver 316 may outperform the ICE receiver 318 in the low-SINR regime. Further, when the Active Set size is equal to one sector, the ICE receiver 318 may not provide gains that might be available with a larger Active Set. Thus, if both of these conditions tested at step 502 are true, then the access terminal 104 may select the Rake receiver 316; but if no, then the process may proceed to step 504.

At step 504, the access terminal 104 may determine whether the channel is a dispersive channel, as described above. If the channel is a dispersive channel, then the process may proceed to step 506, wherein the access terminal 104 may determine whether the average SINR for the ICE receiver 318 (e.g., being determined over any suitable window) is greater than the average SINR of the Rake receiver 316 (e.g., being determined over a suitable window, which may or may not be the same window as utilized for the determination of the average SINR of the ICE receiver 318); and if the size of the Active Set for the access terminal 104 is equal to one (1). If both of these conditions are true, then the access terminal 104 may select the ICE receiver 318; but if no, then the access terminal 104 may select the Rake receiver 316. That is, Returning to step 504, if the access terminal 104 determines that the channel is not a dispersive channel, then the process may proceed to step 508. At step 508, the access terminal 104 may determine whether the number of locked fingers of the Rake receiver 318 is equal to one (1); and if the channel is a flat channel, as described above. If it is not the case that both of these conditions are true, then the access terminal 104 may select the ICE receiver 318. On the other hand, if both of these conditions are true, then the process may proceed to step 510.

Here, selection between the receivers is generally based on SINR thresholds, where the SINR threshold value used depends upon the size of the Active Set for the access terminal 104. That is, if the Active Set is equal to one sector, then one threshold is used; and if the Active Set is greater than one sector, then a different threshold is used. That is, at step 510, the access terminal 104 may determine if the size of the Active Set for the access terminal 104 is greater than one (1). If no, then the process may proceed to step 512, wherein the access terminal 104 may determine whether the average SINR for the ICE receiver 318 (e.g., being determined over any suitable window) is less than a suitable threshold value, such as 6 dB. If the ICE SINR is not less than the threshold, then the access terminal 104 may select the ICE receiver 318; however, if the ICE SINR is less than the threshold, then the access terminal 104 may select the Rake receiver 316.

Returning to step 510, if the size of the Active Set for the access terminal 104 is greater than one (1), then the process may proceed to step 514, wherein the access terminal 104 may determine if the average SINR for the ICE receiver 318 (e.g., being determined over any suitable window) is less than a suitable threshold value, such as 1.7 dB. If yes, then the access terminal 104 may select the Rake receiver 316; but if no, then the access terminal 104 may select the ICE receiver 318.

While the above discussed aspects, arrangements, and embodiments are discussed with specific details and particularity, one or more of the components, steps, features and/or functions illustrated in FIGS. 1, 2, and/or 3 may be rearranged and/or combined into a single component, step, feature or function or embodied in several components, steps, or functions. Additional elements, components, steps, and/or functions may also be added or not utilized without departing from the invention. The apparatus, devices and/or components illustrated in FIGS. 1, 2, and/or 3 may be configured to perform or employ one or more of the methods, features, parameters, or steps described in FIGS. 4 and/or 5. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a machine-readable, computer-readable, and/or processor-readable storage medium, and executed by one or more processors, machines and/or devices.

Those of skill in the art would further appreciate that the various illustrative logical blocks, modules, circuits, and algorithm steps described in connection with the embodiments disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

The invention claimed is:

1. A method of selecting between a first receiver and a second receiver in a wireless communications device, the method comprising:
   determining a size of an Active Set, and one or more factors from among: an average SINR corresponding to at least one of the first receiver or the second receiver, a dispersion of a downlink channel, a flatness metric, or a number of locked fingers at the first receiver or the second receiver; and
   selecting one of the first receiver or the second receiver in accordance with the size of the Active Set and one or more of the determined factors.

2. The method of claim 1, wherein the first receiver comprises a Rake receiver and the second receiver comprises an interference cancellation engine.

3. The method of claim 2, further comprising:
   determining that the average SINR corresponding to the interference cancellation engine is less than a threshold; and
   determining that the size of the Active Set for the wireless communications device is equal to one sector,
   wherein the selecting of the first receiver or the second receiver comprises selecting the Rake receiver.

4. The method of claim 2, further comprising:
   determining that the downlink channel is a dispersive channel;
   determining that the average SINR corresponding to the interference cancellation engine is greater than the average SINR corresponding to the Rake receiver; and
   determining that the size of the Active Set for the wireless communications device is equal to one sector,
   wherein the selecting of the first receiver or the second receiver comprises selecting the interference cancellation engine.

5. The method of claim 2, further comprising:
   determining that the downlink channel is a dispersive channel; and
   determining at least one of: the average SINR corresponding to the interference cancellation is not greater than the average SINR corresponding to the Rake receiver; or the size of the Active Set for the wireless communication device is not equal to one sector,
   wherein the selecting of the first receiver or the second receiver comprises selecting the Rake receiver.

6. The method of claim 2, further comprising:
   determining that the downlink channel is not a dispersive channel; and
   determining at least one of: the number of locked fingers at the Rake receiver is not equal to one, or the flatness metric indicates that the downlink channel is not a flat channel,
   wherein the selecting of the first receiver or the second receiver comprises selecting the interference cancellation engine.

7. The method of claim 2, further comprising:
   determining that the downlink channel is not a dispersive channel;
   determining that the number of locked fingers at the Rake receiver is equal to one; and
   determining that the flatness metric indicates that the downlink channel is a flat channel.

8. The method of claim 7, further comprising:
   determining that the Active Set for the wireless communications device is not greater than one sector; and
   determining that the average SINR corresponding to the interference cancellation engine is less than a threshold,
   wherein the selecting of the first receiver or the second receiver comprises selecting the Rake receiver.

9. The method of claim 7, further comprising:
   determining that the Active Set for the wireless communications device is not greater than one sector; and
   determining that the average SINR corresponding to the interference cancellation engine is not less than a threshold,
   wherein the selecting of the first receiver or the second receiver comprises selecting the interference cancellation engine.

10. The method of claim 7, further comprising:
    determining that the Active Set for the wireless communications device is greater than one sector; and
    determining that the average SINR corresponding to the interference cancellation engine is less than a threshold,
    wherein the selecting of the first receiver or the second receiver comprises selecting the Rake receiver.

11. The method of claim 7, further comprising:
    determining that the Active Set for the wireless communications device is greater than one sector; and
    determining that the average SINR corresponding to the interference cancellation engine is not less than a threshold,
    wherein the selecting of the first receiver or the second receiver comprises selecting the interference cancellation engine.

12. A wireless communication device for use in receiving data, the device comprising:
    a first receiver;
    a second receiver; and
    a processor operatively coupled to the first and the second receiver, the processor configured to select one of the first or the second receiver in accordance with a size of an Active set and one or more of: an average SINR of at least one of the first receiver or the second receiver, a dispersion of a downlink channel, a flatness metric, or a number of locked fingers at the first receiver or the second receiver.

13. The wireless communication device of claim 12, wherein the first receiver comprises a Rake receiver and the second receiver comprises an interference cancellation engine.

14. The wireless communication device of claim 13, wherein the processor is further configured to:
    determine that the average SINR corresponding to the interference cancellation engine is less than a threshold; and determine that the size of the Active Set for the wireless communications device is equal to one sector,
wherein the processor, being configured to select the first receiver or the second receiver, is configured to select the Rake receiver.

15. The wireless communication device of claim 13, wherein the processor is further configured to:
determine that the downlink channel is a dispersive channel;
determine that the average SINR corresponding to the interference cancellation engine is greater than the average SINR corresponding to the Rake receiver; and
determine that the size of the Active Set for the wireless communications device is equal to one sector,
wherein the processor, being configured to select the first receiver or the second receiver, is configured to select the interference cancellation engine.

16. The wireless communication device of claim 13, wherein the processor is further configured to:
determine that the downlink channel is a dispersive channel; and
determine at least one of: the average SINR corresponding to the interference cancellation is not greater than the average SINR corresponding to the Rake receiver; or the size of the Active Set for the wireless communication device is not equal to one sector,
wherein the processor, being configured to select the first receiver or the second receiver, is configured to select the Rake receiver.

17. The wireless communication device of claim 13, wherein the processor is further configured to:
determine that the downlink channel is not a dispersive channel; and
determine at least one of: the number of locked fingers at the Rake receiver is not equal to one, or the flatness metric indicates that the downlink channel is not a flat channel,
wherein the selecting of the first receiver or the second receiver comprises selecting the interference cancellation engine.

18. The wireless communication device of claim 13, wherein the processor is further configured to:
determine that the downlink channel is not a dispersive channel;
determine that the number of locked fingers at the Rake receiver is equal to one; and
determine that the flatness metric indicates that the downlink channel is a flat channel.

19. The wireless communication device of claim 18, wherein the processor is further configured to:
determine that the Active Set for the wireless communications device is not greater than one sector; and
determine that the average SINR corresponding to the interference cancellation engine is less than a threshold,
wherein the processor, being configured to select the first receiver or the second receiver, is configured to select the Rake receiver.

20. The wireless communication device of claim 18, wherein the processor is further configured to:
determine that the Active Set for the wireless communications device is not greater than one sector; and
determine that the average SINR corresponding to the interference cancellation engine is not less than a threshold,
wherein the processor, being configured to select the first receiver or the second receiver, is configured to select the interference cancellation engine.

21. The wireless communication device of claim 18, wherein the processor is further configured to:
determine that the Active Set for the wireless communications device is greater than one sector; and
determine that the average SINR corresponding to the interference cancellation engine is less than a threshold,
wherein the processor, being configured to select the first receiver or the second receiver, is configured to select the Rake receiver.

22. The wireless communication device of claim 18, wherein the processor is further configured to:
determine that the Active Set for the wireless communications device is greater than one sector; and
determine that the average SINR corresponding to the interference cancellation engine is not less than a threshold,
wherein the processor, being configured to select the first receiver or the second receiver, is configured to select the interference cancellation engine.

23. A wireless communication device for use in receiving data, comprising:
first receiving means and second receiving means for receiving a downlink channel;
means for determining a size of an Active Set, and one or more factors from among: an average SINR corresponding to at least one of the first receiving means or the second receiving means, a dispersion of the downlink channel, a flatness metric, or a number of locked fingers at the first receiving means or the second receiving means; and
means for selecting one of the first receiving means or the second receiving means in accordance with the size of the Active Set and one or more of the determined factors.

24. The wireless communication device of claim 23, wherein the first receiving means comprises a Rake receiver and the second receiving means comprises an interference cancellation engine.

25. The wireless communication device of claim 24, further comprising:
means for determining that the average SINR corresponding to the interference cancellation engine is less than a threshold; and
means for determining that the size of the Active Set for the wireless communications device is equal to one sector,
wherein the means for selecting the first receiving means or the second receiving means is configured to select the Rake receiver.

26. The wireless communication device of claim 24, further comprising:
means for determining that the downlink channel is a dispersive channel;
means for determining that the average SINR corresponding to the interference cancellation engine is greater than the average SINR corresponding to the Rake receiver; and
means for determining that the size of the Active Set for the wireless communications device is equal to one sector,
wherein the means for selecting the first receiving means or the second receiving means is configured to select the interference cancellation engine.

27. The wireless communication device of claim 24, further comprising:
means for determining that the downlink channel is a dispersive channel; and
means for determining at least one of: the average SINR corresponding to the interference cancellation is not greater than the average SINR corresponding to the Rake receiver; or the size of the Active Set for the wireless communication device is not equal to one sector,
wherein the means for selecting the first receiving means or the second receiving means is configured to select the Rake receiver.

28. The wireless communication device of claim 24, further comprising:
means for determining that the downlink channel is not a dispersive channel; and
means for determining at least one of: the number of locked fingers at the Rake receiver is not equal to one, or the flatness metric indicates that the downlink channel is not a flat channel,
wherein the means for selecting the first receiving means or the second receiving means is configured to select the interference cancellation engine.

29. The wireless communication device of claim 24, further comprising:
means for determining that the downlink channel is not a dispersive channel;
means for determining that the number of locked fingers at the Rake receiver is equal to one; and
means for determining that the flatness metric indicates that the downlink channel is a flat channel.

30. The wireless communication device of claim 29, further comprising:
means for determining that the Active Set for the wireless communications device is not greater than one sector; and
means for determining that the average SINR corresponding to the interference cancellation engine is less than a threshold,
wherein the means for selecting the first receiving means or the second receiving means is configured to select the Rake receiver.

31. The wireless communication device of claim 29, further comprising:
means for determining that the Active Set for the wireless communications device is not greater than one sector; and
means for determining that the average SINR corresponding to the interference cancellation engine is not less than a threshold,
wherein the means for selecting the first receiving means or the second receiving means is configured to selecting the interference cancellation engine.

32. The wireless communication device of claim 29, further comprising:
means for determining that the Active Set for the wireless communications device is greater than one sector; and
means for determining that the average SINR corresponding to the interference cancellation engine is less than a threshold,
wherein the means for selecting of the first receiving means or the second receiving means is configured to select the Rake receiver.

33. The wireless communication device of claim 29, further comprising:
means for determining that the Active Set for the wireless communications device is greater than one sector; and
means for determining that the average SINR corresponding to the interference cancellation engine is not less than a threshold,
wherein the means for selecting of the first receiving means or the second receiving means is configured to select the interference cancellation engine.

34. A non-transitory computer-readable storage medium operable at a wireless communications device, comprising instructions for causing a computer to:
determine a size of an Active Set, and one or more factors from among: an average SINR corresponding to at least one of a first receiver or a second receiver, a dispersion of a downlink channel, a flatness metric, or a number of locked fingers at the first receiver or the second receiver; and
select one of the first receiver or the second receiver in accordance with the size of the Active Set and one or more of the determined factors.

35. The non-transitory computer-readable storage medium of claim 34, wherein the first receiver comprises a Rake receiver and the second receiver comprises an interference cancellation engine.

36. The non-transitory computer-readable storage medium of claim 35, further comprising instructions for causing a computer to:
determine that the average SINR corresponding to the interference cancellation engine is less than a threshold; and
determine that the size of the Active Set for the wireless communications device is equal to one sector,
wherein the instructions for causing a computer to select the first receiver or the second receiver are configured to select the Rake receiver.

37. The non-transitory computer-readable storage medium of claim 35, further comprising instructions for causing a computer to:
determine that the downlink channel is a dispersive channel;
determine that the average SINR corresponding to the interference cancellation engine is greater than the average SINR corresponding to the Rake receiver; and
determine that the size of the Active Set for the wireless communications device is equal to one sector,
wherein the instructions for causing a computer to select the first receiver or the second receiver are configured to select the interference cancellation engine.

38. The non-transitory computer-readable storage medium of claim 35, further comprising instructions for causing a computer to:
determine that the downlink channel is a dispersive channel; and
determine at least one of: the average SINR corresponding to the interference cancellation is not greater than the average SINR corresponding to the Rake receiver; or the size of the Active Set for the wireless communication device is not equal to one sector,
wherein the instructions for causing a computer to select the first receiver or the second receiver are configured to select the Rake receiver.

39. The non-transitory computer-readable storage medium of claim 35, further comprising instructions for causing a computer to:
determine that the downlink channel is not a dispersive channel; and
determine at least one of: the number of locked fingers at the Rake receiver is not equal to one, or the flatness metric indicates that the downlink channel is not a flat channel,
wherein the instructions for causing a computer to select the first receiver or the second receiver are configured to select the interference cancellation engine.

40. The non-transitory computer-readable storage medium of claim 35, further comprising instructions for causing a computer to:
- determine that the downlink channel is not a dispersive channel;
- determine that the number of locked fingers at the Rake receiver is equal to one; and
- determine that the flatness metric indicates that the downlink channel is a flat channel.

41. The non-transitory computer-readable storage medium of claim 40, further comprising instructions for causing a computer to:
- determine that the Active Set for the wireless communications device is not greater than one sector; and
- determine that the average SINR corresponding to the interference cancellation engine is less than a threshold,
- wherein the instructions for causing a computer to select the first receiver or the second receiver are configured to select the Rake receiver.

42. The non-transitory computer-readable storage medium of claim 40, further comprising instructions for causing a computer to:
- determine that the Active Set for the wireless communications device is not greater than one sector; and
- determine that the average SINR corresponding to the interference cancellation engine is not less than a threshold,
- wherein the instructions for causing a computer to select the first receiver or the second receiver are configured to select the interference cancellation engine.

43. The non-transitory computer-readable storage medium of claim 40, further comprising instructions for causing a computer to:
- determine that the Active Set for the wireless communications device is greater than one sector; and
- determine that the average SINR corresponding to the interference cancellation engine is less than a threshold,
- wherein the instructions for causing a computer to select the first receiver or the second receiver are configured to select the Rake receiver.

44. The non-transitory computer-readable storage medium of claim 40, further comprising instructions for causing a computer to:
- determine that the Active Set for the wireless communications device is greater than one sector; and
- determine that the average SINR corresponding to the interference cancellation engine is not less than a threshold,
- wherein the instructions for causing a computer to select the first receiver or the second receiver are configured to select the interference cancellation engine.

\* \* \* \* \*